(12) United States Patent
Herrada

(10) Patent No.: US 10,965,195 B2
(45) Date of Patent: Mar. 30, 2021

(54) GEARMOTOR FOR AUTOMOTIVE VEHICLE WIPER SYSTEM

(71) Applicant: Valeo Systèmes d'Essuyage, Le Mesnil Saint Denis (FR)

(72) Inventor: Jose Luis Herrada, La Verriere (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 18 days.

(21) Appl. No.: 16/212,951

(22) Filed: Dec. 7, 2018

(65) Prior Publication Data

US 2019/0181725 A1    Jun. 13, 2019

(30) Foreign Application Priority Data

Dec. 8, 2017  (FR) ...................................... 1761816

(51) Int. Cl.
*H02K 9/22*  (2006.01)
*H02K 9/06*  (2006.01)
(Continued)

(52) U.S. Cl.
CPC .................. *H02K 9/22* (2013.01); *B60S 1/08* (2013.01); *B60S 1/166* (2013.01); *B60S 1/26* (2013.01);
(Continued)

(58) Field of Classification Search
CPC .......... H02K 9/22; H02K 9/06; H02K 7/1166; H02K 7/085; H02K 11/215; B60S 1/166;
(Continued)

(56) References Cited

U.S. PATENT DOCUMENTS 10,040,426 B2 *  8/2018  Kimura ..................... B60S 1/08
10,442,401 B2 * 10/2019  Kimura ..................... B60S 1/08
(Continued)

FOREIGN PATENT DOCUMENTS

DE   10 2012 105748 A1   1/2014
DE   10 2012 211080 A1   1/2014

OTHER PUBLICATIONS

DE 102012211080, English translation, printed on Jul. 31, 2020.*
Preliminary Search Report in corresponding French Application No. 1761816, dated Jun. 21, 2018 (2 pages).

*Primary Examiner* — John K Kim
(74) *Attorney, Agent, or Firm* — Osha Bergman Watanabe & Burton LLP

(57) ABSTRACT

A geared motor (1) for a motor-vehicle wiping system including an electric motor (2) is disclosed. The geared motor has a rotor (20) including magnetic elements, a stator (21) having the electromagnetic excitation windings, a rotary shaft (22) rigidly connected to the rotor, a reduction gear (3) linking the rotary shaft (22) and an output shaft of the geared motor, and a casing (4) forming a protective envelope for said reduction gear or the electric motor (2). The reduction gear (3) includes a worm screw and worm wheel gear, the worm screw (30) being rigidly connected to the rotary shaft of the rotor (22), the worm wheel (31) rigidly connected to an output shaft (8) of the geared motor, bearing means (23, 24) for guiding the rotary shaft of the rotor (22) in rotation in relation to the casing (4), and a determination device for determining the angular position of the rotor including a multi-pole magnet (5) that is rigidly connected to the rotary shaft (22) of the rotor (20).

15 Claims, 2 Drawing Sheets

(51) Int. Cl.
    *H02K 7/116*     (2006.01)
    *H02K 7/08*     (2006.01)
    *H02K 11/215*     (2016.01)
    *F16H 57/04*     (2010.01)
    *F16H 1/16*     (2006.01)
    *B60S 1/26*     (2006.01)
    *B60S 1/08*     (2006.01)
    *B60S 1/16*     (2006.01)

(52) U.S. Cl.
    CPC ........... *F16H 1/16* (2013.01); *F16H 57/0415* (2013.01); *F16H 57/0417* (2013.01); *F16H 57/0476* (2013.01); *F16H 57/0498* (2013.01); *H02K 7/085* (2013.01); *H02K 7/1166* (2013.01); *H02K 9/06* (2013.01); *H02K 11/215* (2016.01)

(58) Field of Classification Search
    CPC .......... B60S 1/26; B60S 1/08; F16H 57/0415; F16H 57/0498; F16H 57/0476; F16H 57/0417; F16H 1/16
    USPC ............................................... 310/64, 83, 99
    See application file for complete search history.

(56) References Cited

U.S. PATENT DOCUMENTS

| | | | |
|---|---|---|---|
| 2002/0158527 A1* | 10/2002 | Kawakami | H02K 5/148 310/78 |
| 2005/0183902 A1* | 8/2005 | Segawa | H02K 5/08 180/444 |
| 2014/0139079 A1* | 5/2014 | Kato | H02K 1/2713 310/68 B |
| 2016/0036275 A1* | 2/2016 | Sedlak | H02K 1/278 310/156.12 |
| 2018/0072933 A1* | 3/2018 | Lai | C08K 3/22 |
| 2018/0086308 A1* | 3/2018 | Kimura | H02K 11/33 |
| 2019/0181725 A1* | 6/2019 | Herrada | F16H 1/16 |
| 2019/0312484 A1* | 10/2019 | Herrada | H02K 1/30 |

\* cited by examiner

GEARMOTOR FOR AUTOMOTIVE VEHICLE WIPER SYSTEM

FIELD OF THE INVENTION

The invention relates to a geared motor for a motor-vehicle wiping system

BACKGROUND

Geared motors essentially comprise an electric motor coupled to a reduction gear used to gear down the speed to obtain a significant rotational transmission torque.

Different types of electric motors can be used in a geared motor, notably direct-current brushless electric motors, which have numerous advantages such as a long service life, small size, low power consumption and low noise levels.

Such geared motors are in particular used in motor-vehicle wiping systems including one or more wiper blades, a linkage mechanism for driving the wiper blade or blades in a to-and-fro movement, said output shaft of the geared motor driving the linkage mechanism of the wiping system.

The reduction gear is often a worm gear, the worm screw typically being made of metal and being rigidly connected to the rotary shaft of the rotor, the worm wheel being rigidly connected to the output shaft of the geared motor, which is typically made of plastic.

Two or three bearings, such as ball bearings, are typically used to guide the rotary shaft in rotation, each ball bearing having an inner ring and an outer ring, and the balls being designed to roll in a raceway of the inner ring and in a raceway of the outer ring.

It should also be noted that a reduction gear comprising a worm gear has a low power transmission efficiency, approximately 65%, with the lost power (i.e. 35%) being dissipated in the form of heat in the worm screw and the metal rotary shaft. In the opinion of the inventor, the cooling for the geared motors known in the prior art could be significantly improved.

SUMMARY OF THE INVENTION

The purpose of the present invention is to overcome the aforementioned drawbacks by proposing a worm-drive geared motor with optimized cooling.

Another purpose of the present invention is to propose such a geared motor that is compact along the longitudinal axis of the rotary shaft.

Other purposes and advantages are set out in the description, which is given by way of non-limiting example.

The invention also relates to a geared motor for a motor-vehicle wiping system comprising:
an electric motor including:
  a rotor including magnetic elements,
  a stator having the electromagnetic excitation windings,
  a rotary shaft rigidly connected to the rotor,
  a reduction gear linking the rotary shaft and an output shaft of the geared motor,
  a casing forming a protective envelope for said reduction gear, or the electric motor,
  and in which said reduction gear includes a worm gear system, the worm screw being rigidly connected to the rotary shaft of the rotor, the worm wheel rigidly connected to an output shaft of the geared motor,
  bearing means for guiding the rotary shaft of the rotor in rotation in relation to the casing,
  a determination device for determining the angular position of the rotor including a multi-pole magnet that is rigidly connected to the rotary shaft of the rotor,
According to the invention, the geared motor includes a heat sink in the form of an element projecting radially from the rotary shaft that is distinct from the bearing means and the multi-pole magnet, said heat sink being in an intermediate position between said multi-pole magnet and the worm screw, arranged in the vicinity of the worm screw on said rotary shaft, including an internal bush for assembly of the rotary shaft, said element being designed to form a heat-exchange surface with the internal atmosphere of the casing, the distance Δ separating said heat sink from the worm wheel being equal to or less than the distance separating said multi-pole magnet from the worm wheel.

According to optional features of the invention, taken individually or in combination:
  said heat sink is arranged in the immediate vicinity of the worm wheel, positioned at a distance Δ equal to or less than 4 mm from the worm wheel when same is in rotation,
  the width of said heat sink in the direction of the rotary shaft is between 1 and 3 times the dimension of the multi-pole magnet in said direction,
  said heat sink has a peripheral surface positioned locally facing the worm wheel at said distance Δ, said peripheral surface being inclined in relation to the axis of the rotary shaft such as to be locally oriented substantially tangentially to the worm wheel,
  said heat sink is made of a material with thermal conductivity equal to or greater than $1 \text{ W} \cdot \text{m}^{-1} \cdot \text{K}^{-1}$,
  the material used to make said at least one heat sink is metal or alternatively the material used to make said heat sink is a plastic reinforced with metal particles,
  the external diameter of the bearing means is D and the external diameter of said heat sink is equal to or greater than 0.6 D,
  said bearing means include a bearing for guiding the rotary shaft on the side of the electric motor with the stator with reference to said worm screw, referred to as the stator-side roller bearing, and in which said heat sink is in an intermediate position on said rotary shaft between the worm screw and said stator-side bearing,
  said heat sink is an element attached to the multi-pole magnet, projecting laterally from the multi-pole magnet towards said worm screw, which is made of a different material from the multi-pole magnet,
  said multi-pole magnet includes a ring forming N pairs of north/south magnetic poles, said ring being coaxial with the rotary shaft, having a thickness in the radial direction of between 1 mm and 4 mm, said heat sink forming a peripheral support on the internal diameter of the ring, said support (72) linking the ring to said rotary shaft,
  said heat sink has fins,
  the fins are arranged about the axis of rotation of the heat sink and designed to form ventilation blades constrained to rotate with the rotary shaft,
  during movement of the rotary shaft, the ventilation blades are designed to create a pulsed air flow in a semi-annular interspace defined between the periphery of the worm wheel and a belt of the casing extending longitudinally about the periphery of the worm wheel, on the side opposite the rotary shaft,
  said belt of the casing includes projecting ribs on the inner wall thereof that are oriented longitudinally on said belt.

BRIEF DESCRIPTION OF THE DRAWINGS

The invention can be better understood by reading the description below, accompanied by the attached drawings, in which.

Figure 1:
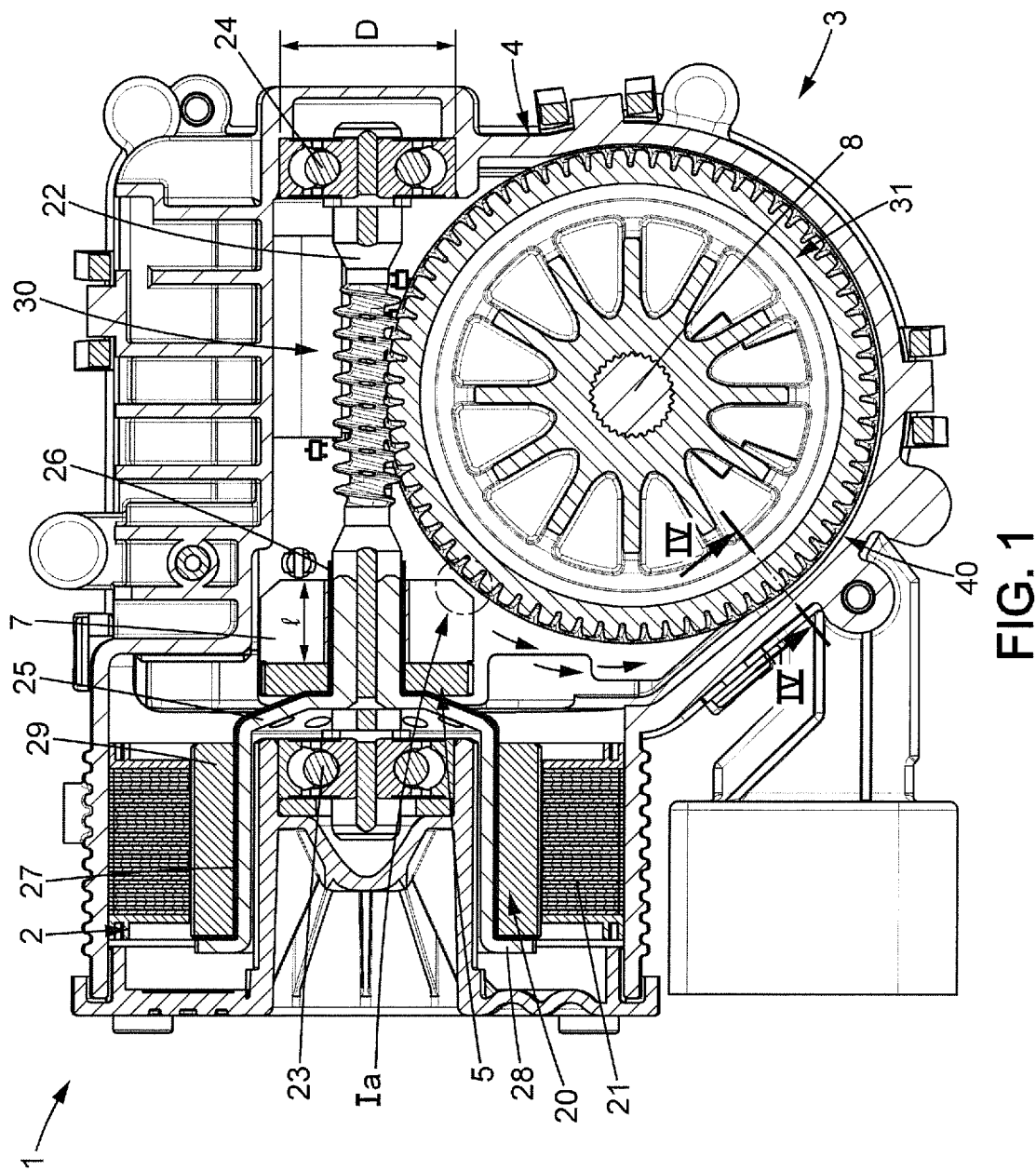
FIG. 1 is a cross section taken along a plane parallel to the axis of the rotary shaft of the motor, showing the geared motor according to one embodiment of the invention, including the stator, the rotor and the rotary shaft, the worm gear and notably, rigidly connected to the rotary shaft, said multi-pole magnet, as well as the heat sink attached to said multi-pole magnet in the form of a solid element.
Figure 1A:
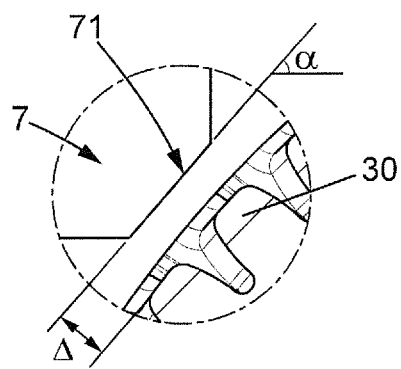
FIG. 1a is a detailed view of a portion (30) of FIG. 1, as denoted by the drawing.
Figure 2:
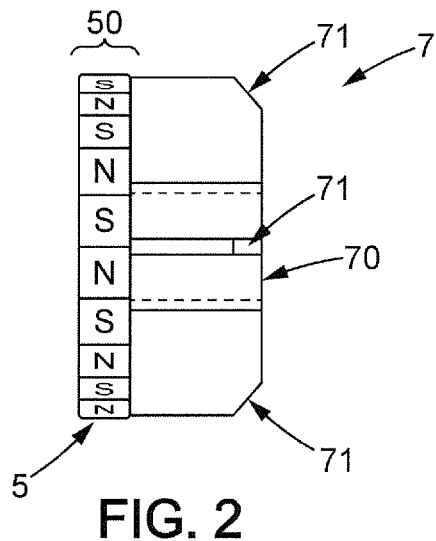
FIGS. 2 and 3 are side and front views of a finned heat sink that can be used instead of the solid heat sink shown in the geared motor in FIG. 1.

The electric motor can be a direct-current brushless motor. Such a motor includes a determination device for determining the angular position of the rotor 20 in relation to the stator 21. A control unit (not shown) is designed to generate control signals to power the electromagnetic excitation windings of the stator 21 as a function of the angular position of the rotor as determined by the determination device for determining the angular position of the rotor.

The determination device for determining the angular position of the rotor includes for this purpose a multi-pole magnet 5 constrained to rotate with the rotor, and one or more Hall-effect sensors (not shown) that are in static positions and are designed to detect changes in the magnetic domains of the multi-pole magnet during rotation of the rotor.

The reduction gear 3 includes a worm screw 30 and a worm wheel 31 gear, the worm screw being rigidly connected to the rotary shaft 22 of the rotor 20, the worm wheel 31 being rigidly connected to an output shaft 8 of the geared motor. This output shaft 8 is substantially perpendicular to the rotary shaft 22 of the electric motor 2. The thread of the worm screw 30 can be obtained from the material of the rotary shaft 22, which is typically made of metal. The worm wheel 31 is typically made of plastic.

The rotary shaft of the rotor 22 is guided in rotation in relation to the casing 4 by bearing means 23, 24. The bearings 23, 24 used can be roller bearings, bushings or any other form of bearing known to the person skilled in the art.

In such a geared motor 1, the friction generated between the worm screw 30 and the worm wheel 31 of the reduction gear 3 cause significant heating of the worm screw and of the rotary shaft 22.

The invention is however intended to optimize cooling of the worm screw 30 and of the rotary shaft 22 of the electric motor 2.

Notably and for this purpose, the geared motor 1 includes a heat sink 7 in the form of an element projecting radially from the rotary shaft 22 that is distinct from the bearing means 23, 24 and distinct from the multi-pole magnet 5, said heat sink 7 being in an intermediate position between said multi-pole magnet 5 and the worm screw 30, arranged in the vicinity of the worm screw 30 on said rotary shaft 22.

The projecting element forming the heat sink 7 has an internal bush 70 for assembling the rotary shaft 22, directly or indirectly by means of a sleeve 26, said element being designed to form a heat-exchange surface with the internal atmosphere of the casing 4.

When in operation, the heat sink 7 is designed to remove heat from the rotary shaft 22, in the vicinity of the worm screw 30, from the internal bush 70 thereof and to transmit the calories radially as far as the heat exchange surface of said element, which can be cooled by the internal atmosphere.

Also notably, the distance $\Delta$ separating said heat sink 7 from the worm wheel 31 is equal to or less than the distance separating said multi-pole magnet 5 from the worm wheel 31.

According to one embodiment, said heat sink 7 is arranged in the immediate vicinity of the worm wheel 31, positioned at a distance $\Delta$ equal to or less than 4 mm from the worm wheel 31 when same is in rotation, for example equal to or less than 3 mm, or even equal to or less than 2 mm.

Furthermore, said heat sink 7 can have a peripheral surface 71 positioned locally facing the worm wheel 31, notably at the distance $\Delta$ from the worm wheel, and inclined in relation to the axis of the rotary shaft 22 such as to be locally oriented substantially tangentially to the worm wheel 31. This inclined peripheral surface helps to maximize the exchange surface of the element forming the heat sink by positioning said projecting element as close as possible to the worm wheel. The width 1 of said heat sink 7, i.e. the dimension of the heat sink in the direction of the rotary shaft, can be between 1 and 3 times the dimension of the multi-pole magnet 5 in said direction, for example between 1.5 and 2.5 times the dimension of the multi-pole magnet 5.

The heat sink can be made of a material with thermal conductivity equal to or greater than $1 \text{ W·m}^{-1}\text{·K}^{-1}$. In particular, the material used to make said heat sink 7 can be metal. The material can also be plastic reinforced with metal particles.

The external diameter of the bearing means is D and the external diameter of said heat sink 7 can be equal to or greater than 0.6 D, for example equal to or greater than 0.7 D or even greater than 0.8 D. The external diameter of said heat sink 7 can be equal to or less than 1.5 D, for example equal to or less than 1.3 D.

Said bearing means 23, 24 can include a bearing 23 for guiding the rotary shaft on the side of the electric motor 2 with the stator 21 with reference to said worm screw 30, referred to as the stator-side roller bearing, along the axis of the shaft 22.

Said heat sink 7 can be in an intermediate position on the rotary shaft 22 between the worm screw 30 and said stator-side bearing 23.

According to one embodiment, said heat sink 7 is an element attached to the multi-pole magnet 5, projecting laterally from the multi-pole magnet 5 towards said worm screw 30, which is made of a different material from the multi-pole magnet 5.

According to one embodiment, said multi-pole magnet 5 may include a ring 50 forming N pairs of north/south magnetic poles, said ring 50 being coaxial with the rotary shaft 22, having a thickness ep in the radial direction of between 1 mm and 4 mm. Said heat sink 7 then forms a peripheral support 72 on the internal diameter of the ring 50, said support 72 linking the ring 50 to said rotary shaft 22.

Said heat sink 7 can also have fins 73 forming the exchange surface with the internal atmosphere.

According to one embodiment, the fins 73 can be arranged about the axis of rotation of the heat sink 7 and designed to form ventilation blades constrained to rotate with the rotary shaft 22. For example, during movement of the rotary shaft 22 about the axis thereof, the ventilation blades are designed to create a pulsed air flow in a semi-annular interspace defined between the periphery of the worm wheel 31 and a belt 40 of the casing 4 extending longitudinally about the periphery of the worm wheel 31, on the side opposite the rotary shaft 22.

The belt 40 of the casing 4 can include projecting ribs 41 on the inner wall thereof that are oriented longitudinally on said belt 40, and which are intended to increase the heat-exchange surface between the internal atmosphere of the casing and the inner wall of the casing. These internal ribs are designed to come into contact with the pulsed air flow.

Notably, the stator-side guide bearing 23 can be arranged inside the rotor 20 and stator 21 assembly, seated in a recess inside the rotor 20. This end of the rotary shaft can thus advantageously be guided by the bearing 23 without requiring a shaft long enough to ensure that the end thereof projects beyond the rotor. Furthermore, the assembly of this bearing 23 inside the rotor does not require a journal on the usable lengthwise section of the rotary shaft outside the rotor, which is already in use for bearing the worm screw and/or for bearing the polar magnet 5. This lengthwise section of the shaft outside the rotor can be minimized in order to increase the compactness of the geared motor in this direction.

For this purpose, a hollow support 25 can bear said magnetic elements 29 about the circumference thereof, and is arranged coaxially and constrained to rotate with the rotary shaft 22. Advantageously, this hollow support 25 covers said bearing 23, which guides the longitudinal end of the rotary shaft 22 on the stator-side of the electric motor 2.

Figure 3:
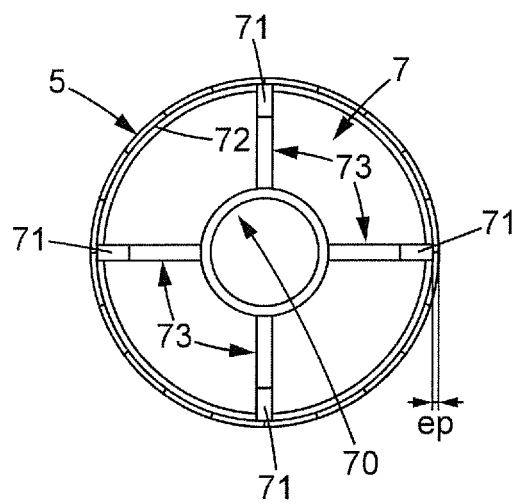
Figure 4:
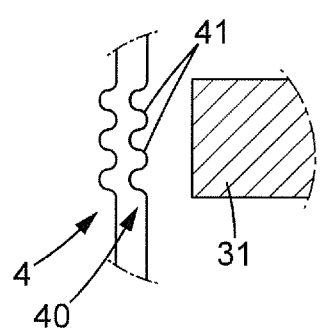
FIG. 4 is a detail cross section view taken along IV-IV in FIG. 1, specifically showing the projecting ribs on the inner wall of the belt of the casing, and The invention also relates to a geared motor 1 for a motor-vehicle wiping system comprising:
an electric motor 2 including:
 a rotor 20 bearing magnetic elements 29, such as permanent magnets,
 a stator 21 having the electromagnetic excitation windings,
 a rotary shaft 22 rigidly connected to the rotor,
a reduction gear 3 linking the rotary shaft 22 and an output shaft 8 of the geared motor, A casing 4, typically made of metal, can form a protective envelope for said reduction gear 3, or the electric motor 2.

This hollow support 25 can still extend axially beyond the longitudinal end of the rotary shaft 22, on the stator-side of the electric motor. This in particular enables said magnetic elements 29 of the rotor to be arranged at least partially beyond the longitudinal end of the rotary shaft 22, as shown by way of example in FIG. 3. This hollow support is for example a body of revolution that includes a hollow tubular portion with an internal diameter able to contain the bearing 23 or a projecting portion of the casing 4.

This hollow support 25 can also include a sleeve 26 enabling the hollow support 25 to be attached to the rotary shaft 22. This sleeve 26 is attached in an intermediate position on the rotary shaft 22 between the reduction gear 3 and the bearing 23. The internal diameter of the sleeve 26 can be adjusted to the external diameter of the rotary shaft in this intermediate position. This may be a tight fit enabling shrink fitting between the hollow support 25 and said rotary shaft 22. This sleeve 26 can also be attached to the shaft 22 by gluing.

The multi-pole magnet 5 can be in the form of a ring assembled about the rotary shaft. The magnetic domains (north/south) extend alternately about the circumference of the ring. This multi-pole magnet 5 can be rigidly connected to said hollow support 25 and arranged about said sleeve 26 for attaching said hollow support 25.

Said hollow support 25 has a lengthwise support section 27 bearing the magnetic elements 29. This lengthwise support section 27 is substantially cylindrical. The magnetic elements 29 of the rotor are rigidly connected to the outer wall of the cylinder. A shoulder 28, in particular in the form of a ring, can extend radially outwards at the distal end of said lengthwise support section 27 bearing the magnetic elements. This shoulder 28 forms a lateral stop for said magnetic elements 29 of the rotor 20. This shoulder 28 facilitates alignment of the magnetic elements along a single diametral line.

Furthermore, the hollow support 25 has a lengthwise linking section linking the sleeve 26 and said cylindrical lengthwise support section 27, which has a larger diameter than the sleeve 26.

The hollow support 25 can essentially comprise a one-piece element, in particular a metal sheet shaped to form, consecutively, the sleeve 26, the linking section, the cylindrical support section 27, or said shoulder 28.

The internal bush 70 of said element forming a heat sink 7 can thus engage directly with an external journal of the rotary shaft 22, or indirectly by means of a sleeve, such as the sleeve 26 of said hollow support 25.

Furthermore, the rotary shaft 22 can be guided in rotation exclusively by two bearings 23, 24 arranged at the two ends of the rotary shaft 22, specifically the bearing 23 on the side of the motor with the stator 21 and another bearing 24 at the other end of the rotary shaft 22.

NOMENCLATURE

1. Geared motor
2. Electric motor
20. Rotor
21. Stator
22. Rotary shaft
23, 24. Bearings, respectively on the stator side, and roller bearing on the side opposite the stator.
25. Hollow support
26. Attachment sleeve (hollow support)
27. Lengthwise cylindrical section (hollow support)
28. Shoulders
29. Magnetic elements
3. Reduction gear
30. Worm screw
31. Worm wheel
4. Casing
40. Belt
41. Internal ribs
5. Multi-pole magnet
50. Ring
7. Heat sinks
70. Internal bush of the heat sink for assembly of the rotary shaft
71. Inclined peripheral surface located in the immediate vicinity of the worm wheel
72. Internal peripheral support for the ring of the multi-pole magnet
73. Fins, notably ventilation blades
8. Output shaft of the geared motor
A. Distance separating the heat sink from the worm wheel.
D. External diameter of bearings
l. Width of the heat sink (dimension in the direction of the rotary shaft)
ep. Ring thickness

The invention claimed is:

1. A geared motor for a motor-vehicle wiping system comprising:
an electric motor including:
a rotor comprising magnetic elements,
a stator comprising electromagnetic excitation windings,
a rotary shaft rigidly connected to the rotor,
a reduction gear linking the rotary shaft and an output shaft of the geared motor, and
a casing forming a protective envelope for said reduction gear, or the electric motor, wherein said reduction gear includes a worm screw and worm wheel gear, the worm screw being rigidly connected to the rotary shaft of the rotor, the worm wheel being rigidly connected to an output shaft of the geared motor;
bearing means for guiding the rotary shaft of the rotor in rotation in relation to the casing;
a determination device for determining the angular position of the rotor including a multi-pole magnet that is rigidly connected to the rotary shaft of the rotor; and
a heat sink in the form of an element projecting radially from the rotary shaft that is distinct from the bearing means and the multi-pole magnet,
said heat sink being in an intermediate position between said multi-pole magnet and the worm screw, arranged in the vicinity of the worm screw on said rotary shaft, including an internal bush for assembly of the rotary shaft,
said heat sink element forming a heat-exchange surface with the internal atmosphere of the casing,
wherein the heat sink element comprises ventilation blades constrained to rotate with the rotary shaft,
wherein, during movement of the rotary shaft, the ventilation blades create a pulsed air flow in a semi-annular interspace defined between an inner wall of the casing and a periphery of the worm wheel on a side opposite the rotary shaft, and
wherein the casing includes projecting ribs on the inner wall within the semi-annular interspace to increase a heat-exchange surface between internal atmosphere of the casing and the inner wall, wherein, during the movement of the rotary shaft, the projecting ribs are in contact with the pulsed air flow.

2. The geared motor according to claim 1, wherein said heat sink is arranged in the immediate vicinity of the worm wheel, positioned at a distance equal to or less than 4 mm from the worm wheel.

3. The geared motor according to claim 1, wherein the width of said heat sink in the direction of the rotary shaft is between 1 and 3 times the dimension of the multi-pole magnet in said direction.

4. The geared motor according to claim 2, wherein said heat sink has a peripheral surface positioned locally facing the worm wheel at said distance said peripheral surface being inclined in relation to an axis of the rotary shaft such as to be locally oriented substantially tangentially to the worm wheel.

5. The geared motor according to claim 1, wherein said heat sink is made of a material with thermal conductivity equal to or greater than $1\ \text{W·m}^{-1}\text{·K}^{-1}$.

6. The geared motor according to claim 5, wherein said heat sink is made of metal.

7. The geared motor according to claim 5, wherein said heat sink is made of a plastic reinforced with metal particles.

8. The geared motor according to claim 1, wherein the external diameter of the bearing means is D and the external diameter of said heat sink is equal to or greater than 0.6 D.

9. The geared motor according to claim 1, wherein said bearing means include a bearing for guiding the rotary shaft on the side of the electric motor with the stator with reference to said worm screw, referred to as the stator-side roller bearing, and in which said heat sink is in an intermediate position on said rotary shaft between the worm screw and said stator-side bearing.

10. The geared motor according to claim 1, wherein said heat sink element is attached to the multi-pole magnet, projecting laterally from the multi-pole magnet towards said worm screw, which is made of a different material from the multi-pole magnet.

11. The geared motor according to claim 10, wherein said multi-pole magnet includes a ring forming N pairs of north/south magnetic poles, said ring being coaxial with the rotary shaft, having a thickness in the radial direction of between 1 mm and 4 mm, said heat sink forming a peripheral support on the internal diameter of the ring, said support linking the ring to said rotary shaft.

12. The geared motor according to claim 1, wherein said heat sink has fins.

13. The geared motor according to claim 12, wherein the fins are arranged about an axis of rotation of the heat sink and form ventilation blades constrained to rotate with the rotary shaft.

14. The geared motor according to claim 13, wherein the semi-annular interspace is further defined between the periphery of the worm wheel and a belt of the casing extending longitudinally about the periphery of the worm wheel, on the side opposite the rotary shaft.

15. The geared motor according to claim 14, wherein said belt of the casing includes the projecting ribs on the inner wall thereof that are oriented longitudinally on said belt.

* * * * *